(12) United States Patent
Tomas et al.

(10) Patent No.: US 12,190,023 B1
(45) Date of Patent: Jan. 7, 2025

(54) METHODS AND SYSTEMS FOR CREATING MECHANICAL COMPUTER-AIDED DESIGN MODEL TO INCLUDE DEFORMATION

(71) Applicant: ANSYS, Inc., Canonsburg, PA (US)

(72) Inventors: Brian Michael Tomas, Boulder, CO (US); Wolfgang Seibold, Lafayette, CO (US)

(73) Assignee: ANSYS, INC., Canonsburg, PA (US)

( * ) Notice: Subject to any disclaimer, the term of this patent is extended or adjusted under 35 U.S.C. 154(b) by 498 days.

(21) Appl. No.: 17/114,671

(22) Filed: Dec. 8, 2020

Related U.S. Application Data

(60) Provisional application No. 63/034,913, filed on Jun. 4, 2020.

(51) Int. Cl.
| | |
|---|---|
| *G06F 30/17* | (2020.01) |
| *G06F 17/17* | (2006.01) |
| *G06F 30/23* | (2020.01) |
| *G06F 111/10* | (2020.01) |
| *G06F 111/04* | (2020.01) |

(52) U.S. Cl.
CPC .............. *G06F 30/17* (2020.01); *G06F 17/17* (2013.01); *G06F 30/23* (2020.01); *G06F 2111/04* (2020.01); *G06F 2111/10* (2020.01)

(58) Field of Classification Search
CPC .......... G06F 30/17; G06F 17/17; G06F 30/23; G06F 2111/04; G06F 2111/10
USPC .......................................................... 703/1
See application file for complete search history.

(56) References Cited

U.S. PATENT DOCUMENTS

| | | | | |
|---|---|---|---|---|
| 6,323,863 | B1 * | 11/2001 | Shinagawa | G06T 1/00 345/473 |
| 6,560,570 | B1 * | 5/2003 | Dohrmann | G06F 17/17 703/2 |
| 10,102,671 | B2 * | 10/2018 | Suresh | G06T 17/30 |
| 10,296,664 | B2 * | 5/2019 | Sheng | G06F 30/17 |
| 2007/0139444 | A1 * | 6/2007 | Dupont | G06F 30/23 345/647 |
| 2015/0127301 | A1 | 5/2015 | Seibold et al. | |

OTHER PUBLICATIONS

George William Celniker, ShapeWright—finite element based freeform shape design, 1990, Diss. Massachusetts Institute of Technology, pp. 1-192.*

(Continued)

*Primary Examiner* — Juan C Ochoa
(74) *Attorney, Agent, or Firm* — Douglas A. Gastright

(57) ABSTRACT

A mechanical computer-aided design (MCAD) model representing an object is received. The MCAD model contains a surface with a face defined therein. Deformation of the face is obtained in a simulation based on the MCAD model. The surface is defined by Non-Uniform Rational Basis Spline patches and mapped to a two-dimensional (2-D) parametric grid. The 2-D grid contains a first group of grid points representing the face and a second group of grid points representing outside of the face. The deformation of the face is applied to the first group of grid points. The deformation is extrapolated to the second group of grid points. An updated MCAD model representing a deformed object is generated using the 2-D grid associated with the applied deformation and the extrapolated deformation.

11 Claims, 19 Drawing Sheets

(56) References Cited

OTHER PUBLICATIONS

Le et al., "A gradient-based, parameter-free approach to shape optimization", 2011, Computer Methods in Applied Mechanics and Engineering 200.9-12, pp. 985-996.*

Aicha Ben Makhlouf et al., "Reconstruction of a CAD model from the deformed mesh using B-Spline Surfaces", International Journal of Computer Integrated Manufacturing, Apr. 2019.

* cited by examiner

Central Finite Difference

| Derivative | Accuracy | -4 | -3 | -2 | -1 | 0 | 1 | 2 | 3 | 4 |
|---|---|---|---|---|---|---|---|---|---|---|
| 2nd | 2 | | | | 1 | -2 | 1 | | | |
| 2nd | 4 | | | -1/12 | 4/3 | -5/2 | 4/3 | -1/12 | | |
| 2nd | 6 | | 1/90 | -3/20 | 3/2 | -49/18 | 3/2 | -3/20 | 1/90 | |
| 2nd | 8 | -1/560 | 8/315 | -1/5 | 8/5 | -205/72 | 8/5 | -1/5 | 8/315 | -1/560 |
| 3rd | 2 | | | -1/2 | 1 | 0 | -1 | 1/2 | | |
| 3rd | 4 | | 1/8 | -1 | 13/8 | 0 | -13/8 | 1 | -1/8 | |
| 3rd | 6 | -7/240 | 3/20 | -169/120 | 61/30 | 0 | -61/30 | 169/120 | -3/20 | 7/240 |

*FIG. 10A*

Forward Finite Difference

| Derivative | Accuracy | 0 | 1 | 2 | 3 | 4 | 5 | 6 | 7 | 8 |
|---|---|---|---|---|---|---|---|---|---|---|
| 2nd | 1 | 1 | -2 | 1 | | | | | | |
| 2nd | 2 | 2 | -5 | 4 | -1 | | | | | |
| 2nd | 3 | 35/12 | -26/3 | 19/2 | -14/3 | 11/12 | | | | |
| 2nd | 4 | 15/4 | -77/6 | 107/6 | -13 | 61/12 | -5/6 | | | |
| 2nd | 5 | 203/45 | -87/5 | 117/4 | -254/9 | 33/2 | -27/5 | 137/180 | | |
| 2nd | 6 | 469/90 | -223/10 | 879/20 | -949/18 | 41 | -201/10 | 1019/180 | -7/10 | |
| 3rd | 1 | -1 | 3 | -3 | 1 | | | | | |
| 3rd | 2 | -5/2 | 9 | -12 | 7 | -3/2 | | | | |
| 3rd | 3 | -17/4 | 71/4 | -59/2 | 49/2 | -41/4 | 7/4 | | | |
| 3rd | 4 | -49/8 | 29 | -461/8 | 62 | -307/8 | 13 | -15/8 | | |
| 3rd | 5 | -967/120 | 638/15 | -3929/40 | 389/3 | -2545/24 | 268/5 | -1849/120 | 29/15 | |
| 3rd | 6 | -801/60 | 349/6 | -18353/120 | 2391/10 | -14577/6 | 4891/30 | -561/8 | 527/30 | -469/240 |

*FIG. 10B*

| Backward Finite Difference | | | | | | | | | |
|---|---|---|---|---|---|---|---|---|---|
| Derivative | Accuracy | -8 | -7 | -6 | -5 | -4 | -3 | -2 | -1 | 0 |
| 2nd | 1 | | | | | | | 1 | -2 | 1 |
| 2nd | 2 | | | | | | -1 | 4 | -5 | 2 |
| 3rd | 1 | | | | | | 1 | 3 | -3 | 1 |
| 3rd | 2 | | | | | 3/2 | -7 | 12 | -9 | 5/2 |

*FIG. 10C*

$$\begin{pmatrix} 1 & 1 & \cdots & 1 & 1 \\ -p & -p+1 & \cdots & p-1 & p \\ (-p)^2 & (-p+1)^2 & \cdots & (p-1)^2 & p^2 \\ \vdots & \vdots & \vdots & \vdots & \vdots \\ \vdots & \vdots & \vdots & \vdots & \vdots \\ \vdots & \vdots & \vdots & \vdots & \vdots \\ (-p)^{2p} & (-p+1)^{2p} & \cdots & (p-1)^{2p} & p^{2p} \end{pmatrix} \begin{pmatrix} a_{-p} \\ a_{-p+1} \\ a_{-p+2} \\ \vdots \\ \vdots \\ \vdots \\ a_p \end{pmatrix} = \begin{pmatrix} 0 \\ 0 \\ 0 \\ \vdots \\ m! \\ \vdots \\ 0 \end{pmatrix}$$

where the only non-zero value on the right hand side is in the $(m+1)$-th row.

*FIG. 10D*

METHODS AND SYSTEMS FOR CREATING MECHANICAL COMPUTER-AIDED DESIGN MODEL TO INCLUDE DEFORMATION

CROSS-REFERENCE TO RELATED APPLICATIONS

This application claims benefits of U.S. Provisional Patent Application Ser. No. 63/034,913 for "METHOD AND SYSTEM FOR MODEL DEFORMATION", filed Jun. 4, 2020. The contents of which are hereby incorporated by reference in its entirety for all purposes.

FIELD

The subject matter described herein relates to mechanical computer-aided design (MCAD) technology, more particularly to methods and systems for creating a deformed MCAD model to include deformation obtained in an engineering analysis simulation using an engineering analysis model generated from an undeformed MCAD model.

BACKGROUND

MCAD software is used to create and modify two- and three-dimensional geometry, in order to design, assess and document mechanical components and sheet metal components, assemblies, and products. These components include molds, dies and other tooling. In the development process, MCAD software can be used to: a) explore different iterations of a design, either conceptually or in detail, such that users can build out different alternatives and options, comparing them to each other; b) assess the form and fit of designs; and c) generate engineering documentation. The documentation is released to manufacturing as part of the specifications used to source, fabricate and produce products. MCAD software provides many capabilities including, but not limited to, three dimensional modeling (e.g., parametric modeling, direct modeling), engineering documentation (e.g., drafting, model based definitions, derived drawing creation), two-dimensional sketching, assembly modeling.

Non-uniform rational basis spline (NURBS) is a mathematical model commonly used in computer graphics for generating and representing curves and surfaces. It offers great flexibility and precision for handling both analytic shapes (surfaces defined by common mathematical formulae) and modeled shapes. NURBS are commonly used in computer-aided design (CAD), manufacturing (CAM), and engineering (CAE) and are part of industry wide standards. NURBS tools are also found in various 3D modeling and animation software packages.

NURBS patches can contain an n-by-m grid of points, where n and m can be any positive integer (and not necessarily equal). The grid can have a rectangular topology, but of course the points may be positioned anywhere in space, to shape the curve or surface accordingly.

An MCAD model contains connected MCAD faces connected at respective MCAD edges. Each MCAD face is defined in an MCAD surface and bordered by one or more MCAD edges. An MCAD surface can be defined by NURBS patches. An MCAD edge can be defined by a NURBS curve.

SUMMARY

Methods and systems are disclosed for creating a deformed mechanical computer-aided design (MCAD) model to include deformation obtained in an engineering analysis simulation using an engineering analysis model generated from an undeformed MCAD model.

In one aspect of the disclosure, a mechanical computer-aided design (MCAD) model representing an object mechanical computer-aided design (MCAD) model representing an object is received in a computer system. The MCAD model contains a surface with a face defined therein. Deformation of the face is obtained in a simulation based on the MCAD model. The surface is defined by Non-Uniform Rational Basis Spline patches and mapped to a two-dimensional (2-D) parametric grid. The 2-D grid contains a first group of grid points representing the face and a second group of grid points representing outside of the face. The deformation of the face is applied to the first group of grid points. The deformation is extrapolated to the second group of grid points. An updated MCAD model representing a deformed object is generated using the 2-D grid associated with the applied deformation and the extrapolated deformation.

In another aspect, data representing a mechanical computer-aided design (MCAD) surface having a face defined therein are received. The received data further includes a deformation of the face, which is obtained in an engineering analysis simulation. The MCAD surface belongs to an MCAD model representing undeformed geometry of a physical object. The deformation of the face is obtained in a simulation using a computer-aided engineering mesh model generated from the MCAD model. A two-dimensional (2-D) grid is generated from the MCAD surface. Grid data inside of a region in the 2-D grid are obtained from the deformation of the face. The region in the 2-D grid corresponds to the face. Grid data outside of the region are determined from the known grid data inside of the region using an extrapolation procedure based on surface smoothness criteria. The extrapolation procedure can include a linear least squares minimization of the second and third spatial derivative using the known grid data inside of the region. A deformed MCAD surface is created using the grid data inside and outside of the region. The deformed MCAD surface belongs to a deformed MCAD model representing deformed geometry of the physical object.

In yet another aspect, a linear least squares constraint is imposed on grid cells corresponding to a border of the region.

In still another aspect, the grid data outside of the region corresponding to a face are determined using an interpolation procedure (e.g., Laplace interpolation) when one or more holes are located outside of the region.

Non-transitory computer-readable medium (i.e., physically embodied computer program products) is described that stores instructions, which when executed by one or more data processors of one or more computing systems, cause at least one data processor to perform operations herein. Similarly, computer systems are described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

To reconstruction of an MCAD model from a given deformed mesh is a challenge task. One advantage of the subject matter is to allow deformations in a mesh model to be applied to the original MCAD model. Deformations or displacements of the original object (i.e., part/product/structure) can generally be obtained in a simulation using a mesh model based on the original MCAD model. Additionally, the updated MCAD model can maintain the same parameterization as the original MCAD model. Furthermore, the disclosed techniques can apply to any arbitrary surface.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 10A is a table showing central finite difference coefficients;

FIG. 10B is a table showing forward finite difference coefficients;

FIG. 10C is a table showing backward finite difference coefficients; and

FIG. 10D shows a set of linear equation system used in central finite difference method.

DETAILED DESCRIPTION

The disclosure describes a mechanism to generate a deformed MCAD model representing deformed geometry of a physical object whose initial geometry is represented in an undeformed MCAD model. Deformation is the initial geometry applied with displacements. The displacements can be obtained from an engineering analysis simulation using an engineering analysis model or computer-aided engineering (CAE) mesh model (i.e., mesh model) generated from MCAD faces and MCAD edges of the undeformed MCAD model.

Used hereinafter in this disclosure, terms "MCAD face" and "face" are interchangeable, and terms "MCAD edge" and "edge" are interchangeable. An MCAD model contains faces and edges. Each face is defined in an MCAD surface and bordered by one or more loops of edges. Each MCAD surface is parameterized to a two-dimensional (2-D) grid. Deformation of a face is converted to grid data inside of a region in the 2-D grid. The region corresponds to the face. The region is a mapped area in the 2-D grid of the face. The one-to-one mapping is based on the parameterization of the underformed MCAD surface and both the undeformed and deformed CAE mesh models. Grid data outside of the region are determined using the known grid data inside of the region via an extrapolation procedure based on surface smoothness criteria.

The extrapolation procedure can include a linear least squares minimization of the second and third spatial derivatives at grid points outside of the region using the known grid data. A deformed MCAD surface can then be created using the grid data inside and outside of the region.

Figure 1:
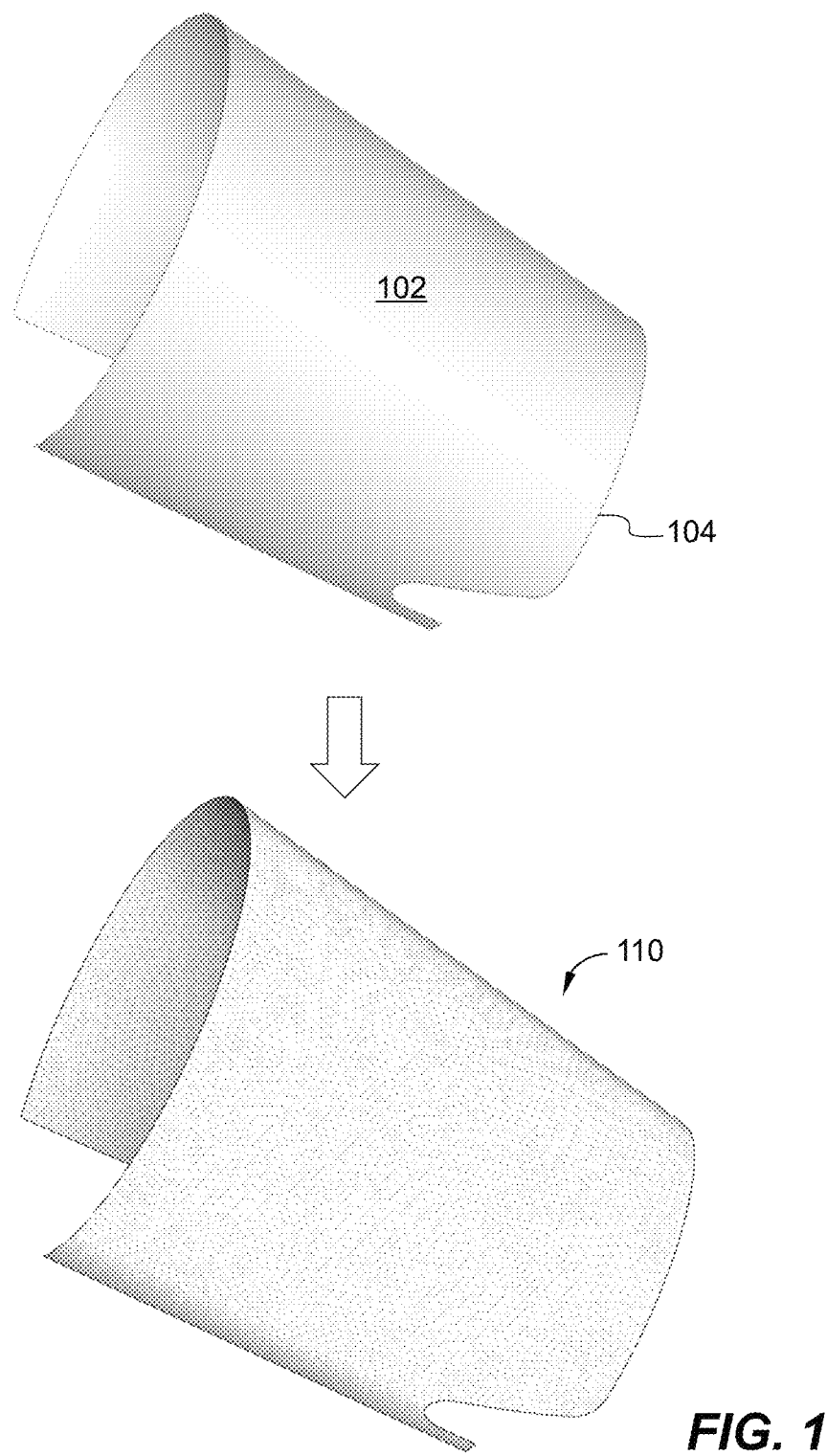
FIG. 1 is a diagram illustrating an example MCAD face and an corresponding engineering analysis model.

An example MCAD face 102 in an MCAD surface is shown in FIG. 1. The face 102 is bordered with edges 104 defining the trimmed boundary of the MCAD surface. The edges 104 are based on smooth parametric curves defined over a one-dimensional interval.

Also shown in FIG. 1, an example engineering analysis model or computer-aided engineering (CAE) mesh model, for example, a finite element analysis model 110 is generated from faces/edges of the MCAD model. The example engineering analysis model 110 contains a number of triangular elements (i.e., triangulation or faceted representation of the face).

Figure 2:
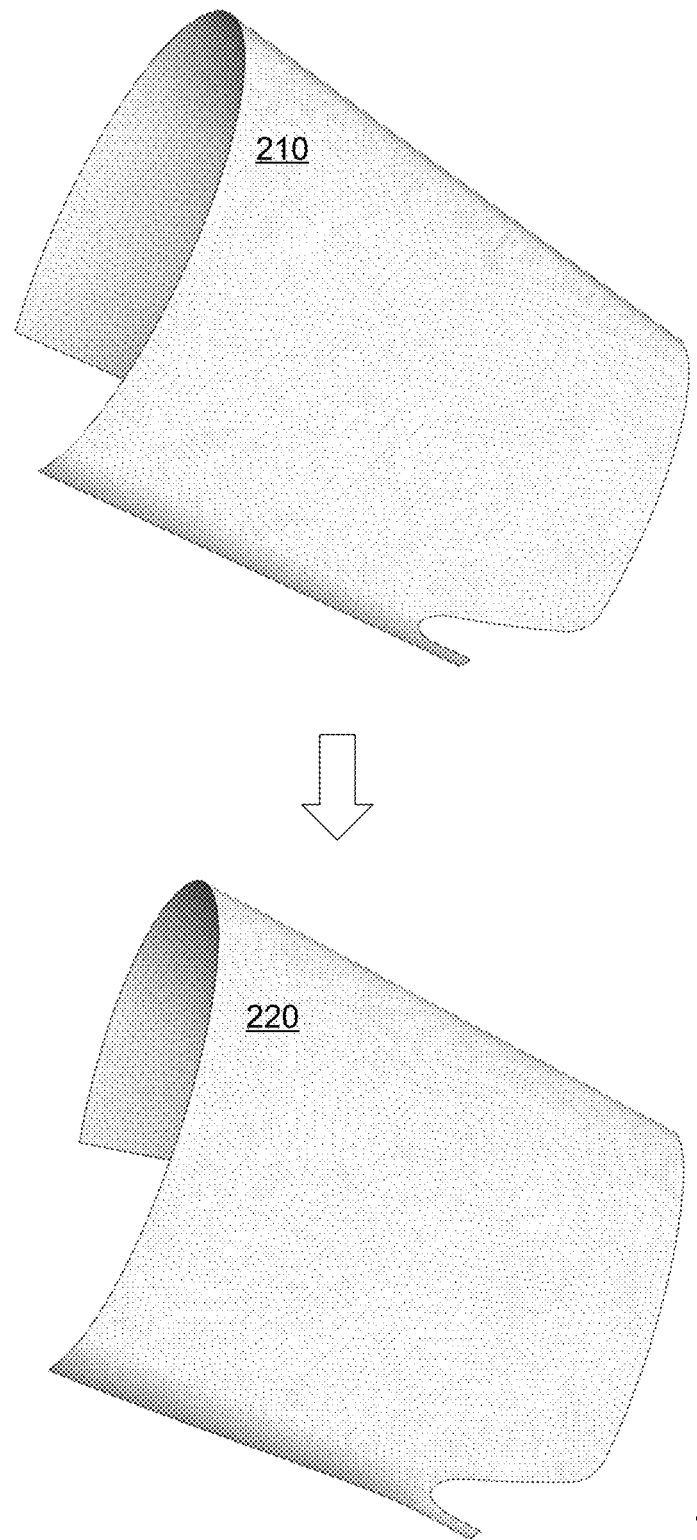
FIG. 2 is a diagram showing an example correlation between undeformed and deformed engineering analysis models.

FIG. 2 shows initial CAE mesh model 210 and deformed CAE mesh model 220. The deformed CAE mesh model 220 is a result of an engineering analysis simulation (e.g., a finite element analysis). Because the initial CAE mesh model 210 is generated from an MCAD model, deformation can be associated with a corresponding face as deformed geometry in the MCAD model. Further, a pointwise displacement can be defined between a node in the initial CAE mesh model 210 and the same node in the deformed CAE mesh model 220.

Figure 3A:
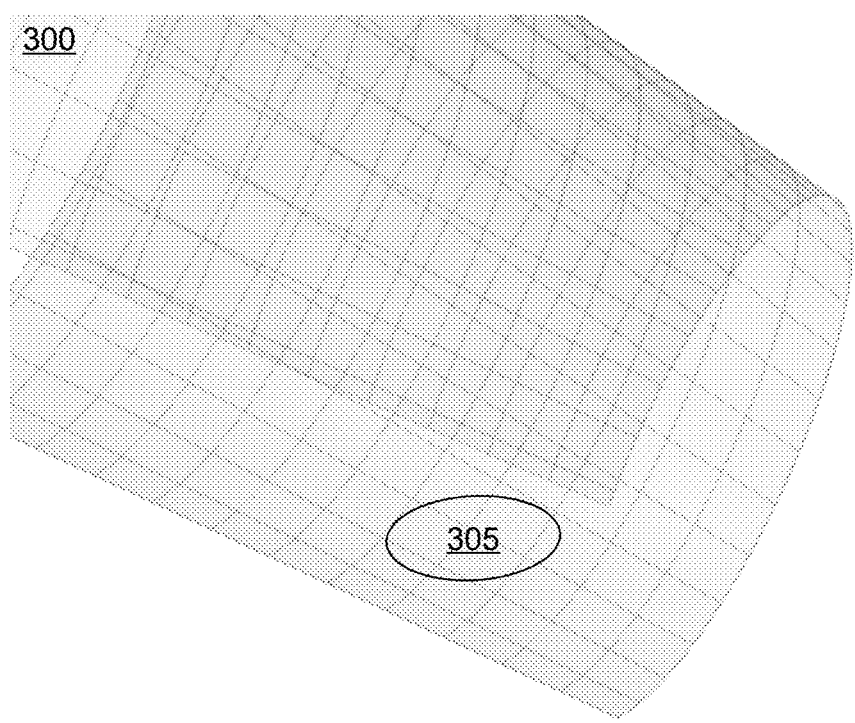
FIGS. 3A-3B collectively is a diagram illustrating an example MCAD surface with a corresponding two-dimensional grid in a rectangular parametric space.
Figure 3B:
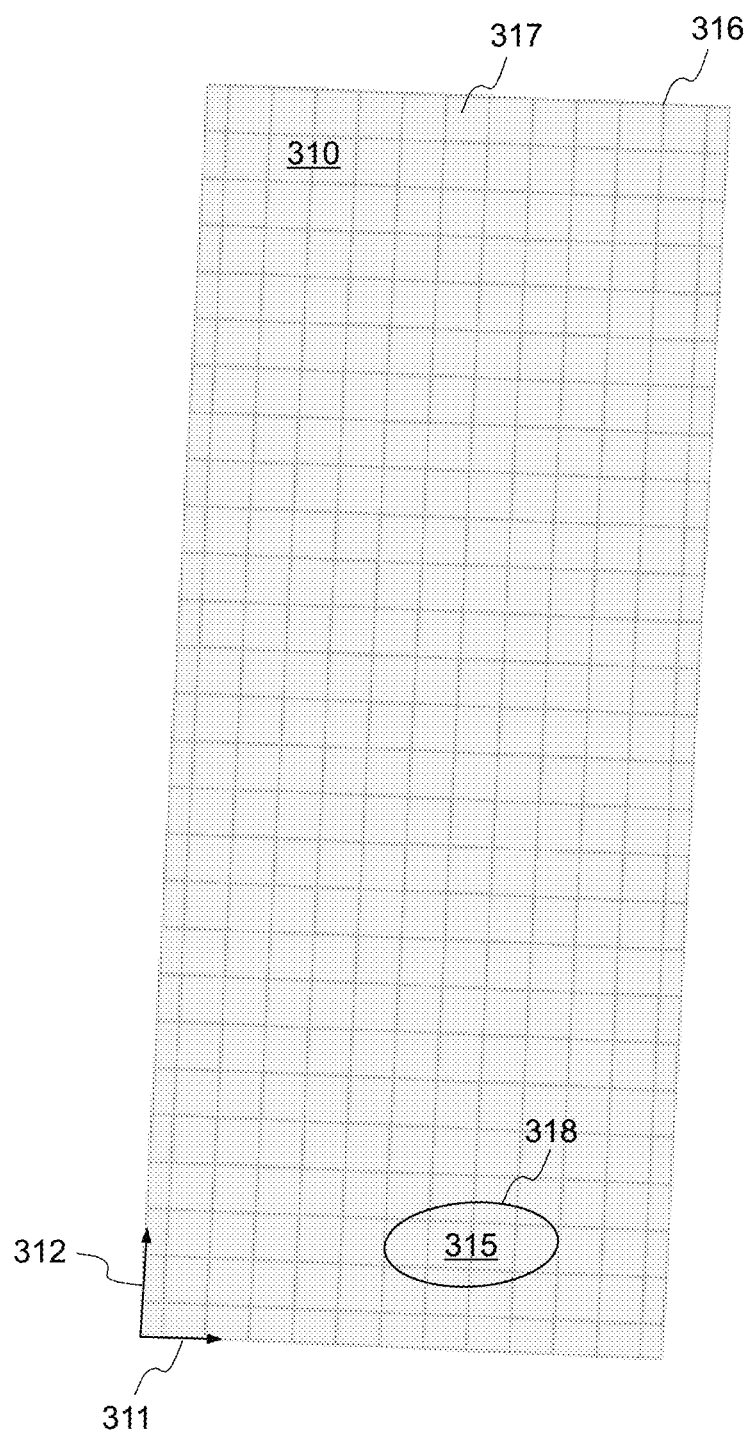

Any given MCAD surface 300 shown in FIG. 3A containing no self-intersections with continuous curvature can be mapped to a two-dimensional (2-D) grid 310 using its parameterization with two dimensions, u 311 and v 312 as shown in FIG. 3B. The 2-D grid 310 is generated from an MCAD surface 300. When a face 305 is defined in the MCAD surface 300, a region 315 with a border 318 in the 2-D grid 310 can correspond to the face 305.

The 2-D grid 310 contains an array of grid points 316 uniformly distributed in a rectangular space on a parametric plane. A grid cell 317 has a rectangular or shape defined by four grid points. Each grid point has a coordinate (u, v) in the parametric plane. Grid data is a geometry data in a direction perpendicular to the parametric plane at each grid point. For example, deformation of the face 305 can be transformed to grid data inside of the region 315 using an interpolation procedure.

Figure 4:
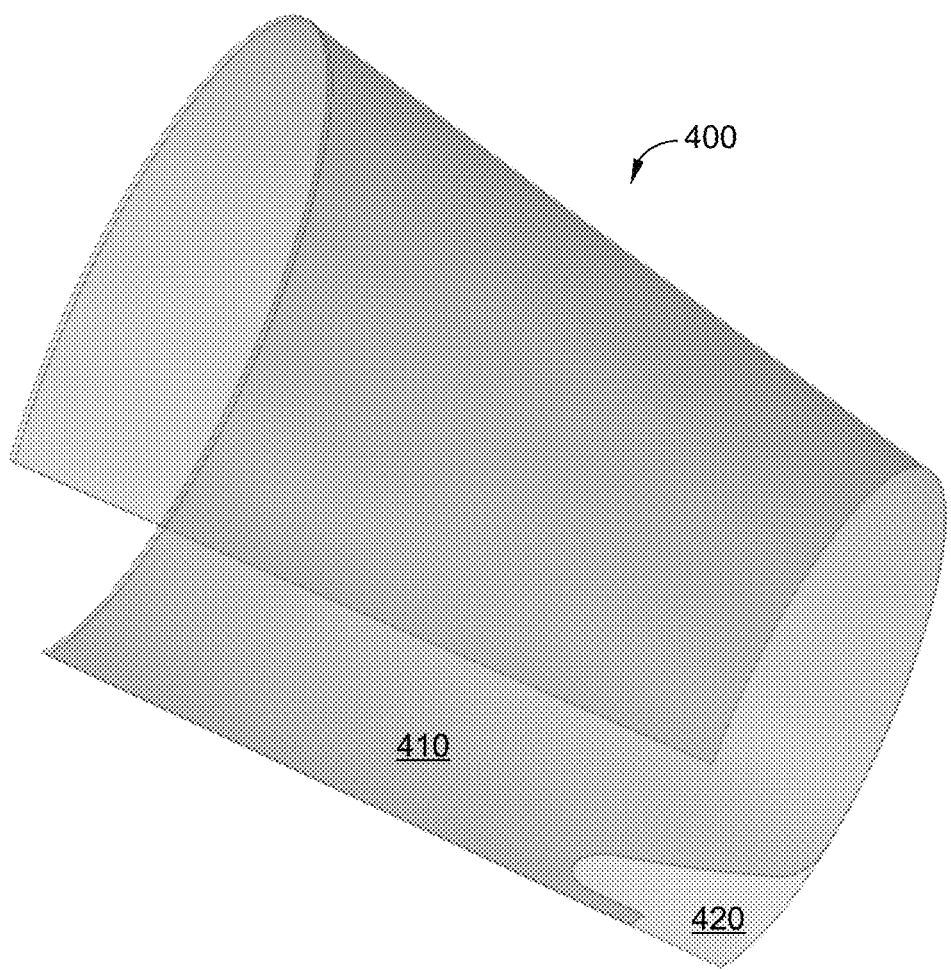
FIG. 4 is a diagram showing an example MCAD surface containing a face.

A face can be a portion of a surface. One or more edges can be applied to trim the MCAD surface to form the face. As an example, FIG. 4 shows an MCAD surface 400 contains a region inside of a face 410 and another region outside of the face 420. Deformation of the region inside of the face can be obtained from a simulation. However, there is no information for the region outside of the face. In order to create a deformed MCAD surface, data for the region outside of the face need to be determined with an extrapolation procedure based on surface smoothness criteria.

Figure 5A:
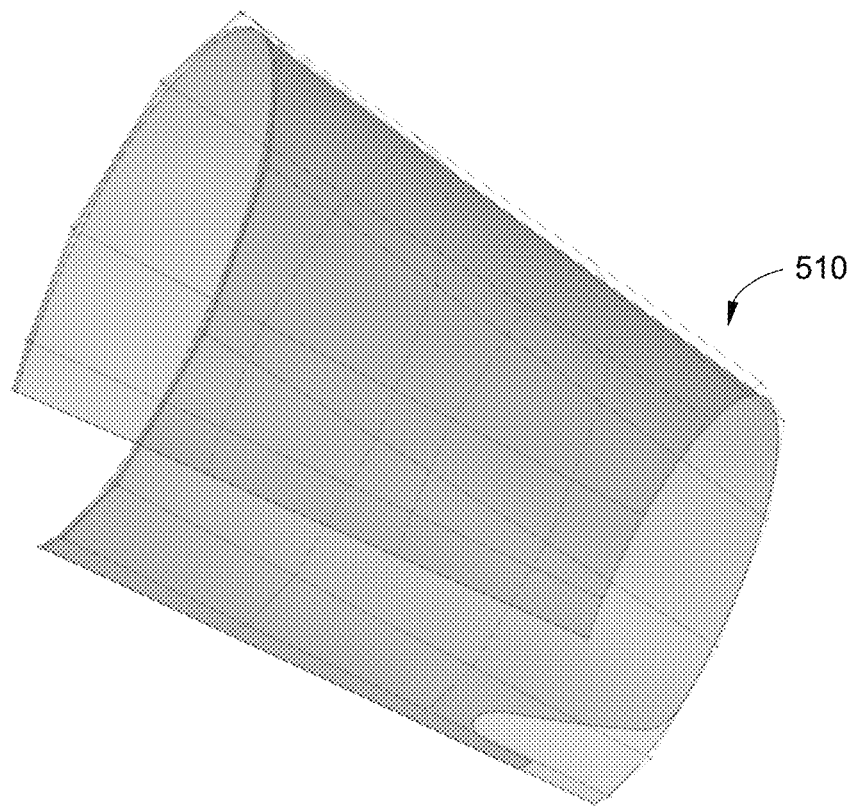
FIGS. 5A-5B collectively is a diagram showing example undeformed and deformed MCAD surfaces.
Figure 5B:
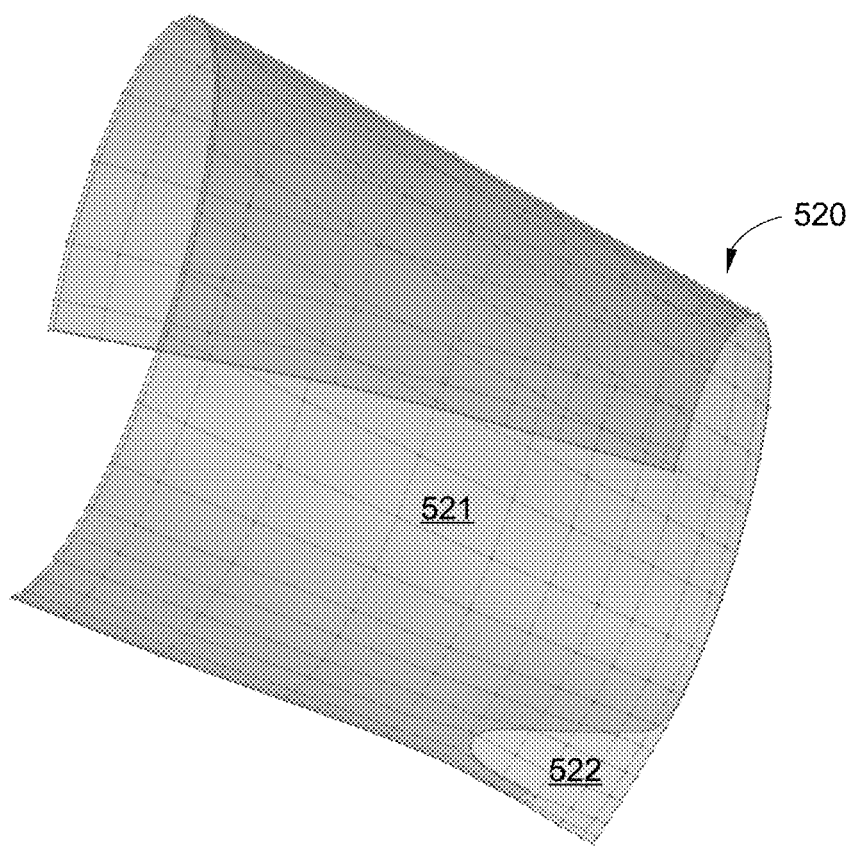

FIGS. 5A-5B show an undeformed MCAD surface 510 for initial geometry and a deformed MCAD surface 520 for deformed geometry. Control points are also shown over the respective sets of NURBS patches defining the MCAD surfaces. To fit NURBS patches for defining the deformed MCAD surface 520, the grid data 521 inside of a region corresponding the face 521 and the grid data 522 outside of the region are required. The grid data 521 inside of the region can be obtained from the deformation of the face. The grid data 522 outside of the region are unknown. The grid data 522 outside of the region can be determined using the known grid data 521 inside of the region via an extrapolation procedure based on surface smoothness criteria.

The surface smoothness criteria can ensure that the deformed MCAD surface 520 is smooth either singly curved or doubly curved. The extrapolation procedure can include minimization of the second spatial derivatives and the third spatial derivatives at grid points outside of the region using the known grid data with respects to the parametric dimensions. The minimization can be based on linear least squares minimization. Calculations of the second and the third spatial derivatives can be carried out based on known numerical methods, for example, finite difference method (i.e., using finite difference stencils).

In mathematics, to approximate a derivative to an arbitrary order of accuracy, it is possible to use the finite difference method. A finite difference method can be central, forward or backward.

Central Finite Difference

FIG. 10A contains a table showing the coefficients of the central finite differences, for several orders of accuracy and with uniform grid spacing. As an example, the third derivative with a second-order accuracy is as follows:

$$f'''(x_0) \approx \frac{-\frac{1}{2}f(x_{-2}) + f(x_{-1}) - f(x_{+1}) + \frac{1}{2}f(x_{+2})}{h_x^3} + O(h_x^2)$$

where $h_x$ represents a uniform grid spacing between each finite difference interval, and $x_n = x_0 + nh_x$.

For the m-th derivative with accuracy n, there are $$2p + 1 = 2\left\lfloor \frac{m+1}{2} \right\rfloor - 1 + n$$

central coefficients $a_{-p}, a_{-p+1}, \ldots, a_{p-1}, a_p$. These are given by the solution to the linear equation system shown in FIG. 10D.

Forward Finite Difference

FIG. 10B shows a table contains the coefficients of the forward differences, for several orders of accuracy and with uniform grid spacing. As an example, the first derivative with a third-order accuracy and the second derivative with a second-order accuracy are as follows:

$$f'(x_0) \approx \frac{-\frac{11}{6}f(x_0) + 3f(x_{+1}) - \frac{3}{2}f(x_{+2}) + \frac{1}{3}f(x_{+3})}{h_x} + O(h_x^3)$$

$$f''(x_0) \approx \frac{2f(x_0) - 5f(x_{+1}) + 4f(x_{+2}) - f(x_{+3})}{h_x^2} + O(h_x^2)$$

Backward Finite Difference

While the corresponding backward approximations are given by the following:

$$f'(x_0) \approx \frac{\frac{11}{6}f(x_0) - 3f(x_{-1}) + \frac{3}{2}f(x_{-2}) - \frac{1}{3}f(x_{-3})}{h_x} + O(h_x^3)$$

$$f''(x_0) \approx \frac{2f(x_0) - 5f(x_{-1}) + 4f(x_{-2}) - f(x_{-3})}{h_x^2} + O(h_x^2)$$

In general, to get the coefficients of the backward approximations, give all odd derivatives listed in the table the opposite sign, whereas for even derivatives the signs stay the same. FIG. 10C shows a table illustrates this.

Further, an MCAD surface that contains a face for undeformed geometry can be defined by NURBS patches over a rectangular parametric space (e.g., a 2-D grid). Deformed geometry of a face needs to have an underlying MCAD surface that is again defined over the same parametric rectangular space. Additionally, the disclosed mechanism can maintain the same topological relationship between the parameterization of the undeformed MCAD surface and the deformed MCAD surface. The disclosed mechanism can fit an MCAD surface to include grid data from the known deformation of the face. The mapping over the parametric rectangular space can be evaluated to find the control points for the deformed MCAD surface.

This ensures that the map is smooth when going from grid data inside of the region to the grid data outside of the region. The combined minimization of both the second and third spatial derivatives produces good results for MCAD surfaces that are either singly or doubly curved, whereas using only the second derivatives gives good results for singly curved MCAD surfaces, and using only the third derivatives gives good results for doubly curved MCAD surfaces. Furthermore, additional linear least squares constraints are applied to grid cells corresponding to edges bordering a face. The additional constraints are to maintain smoothness for transitions between the grid data inside of the region and the grid data outside of the region.

Figure 6A:
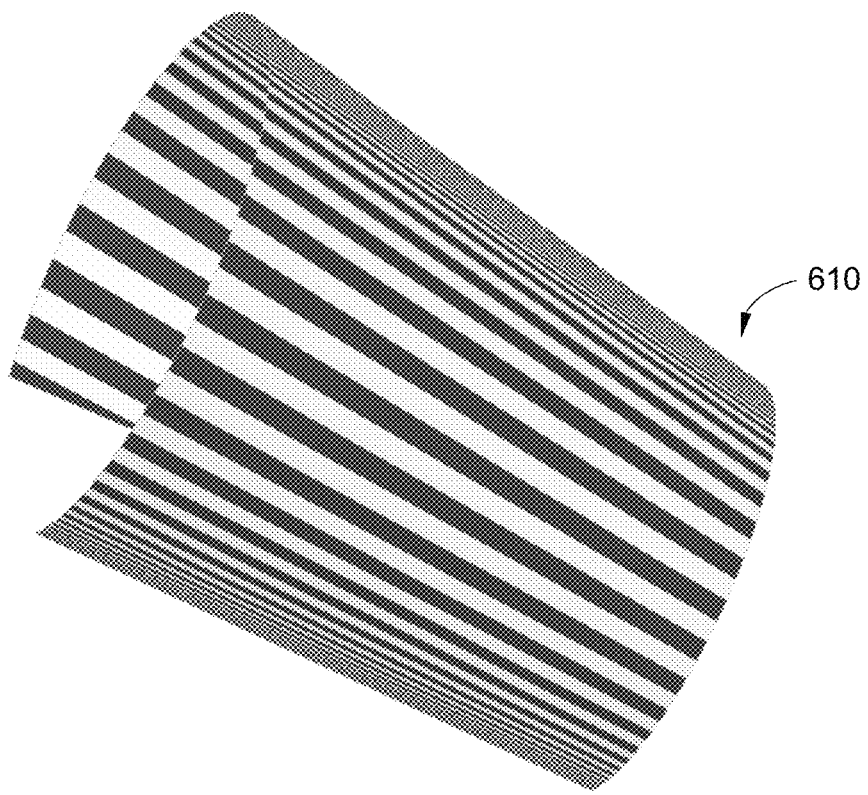
FIGS. 6A-6B collectively is a diagram showing example smoothness of undeformed and deformed MCAD surfaces.
Figure 6B:
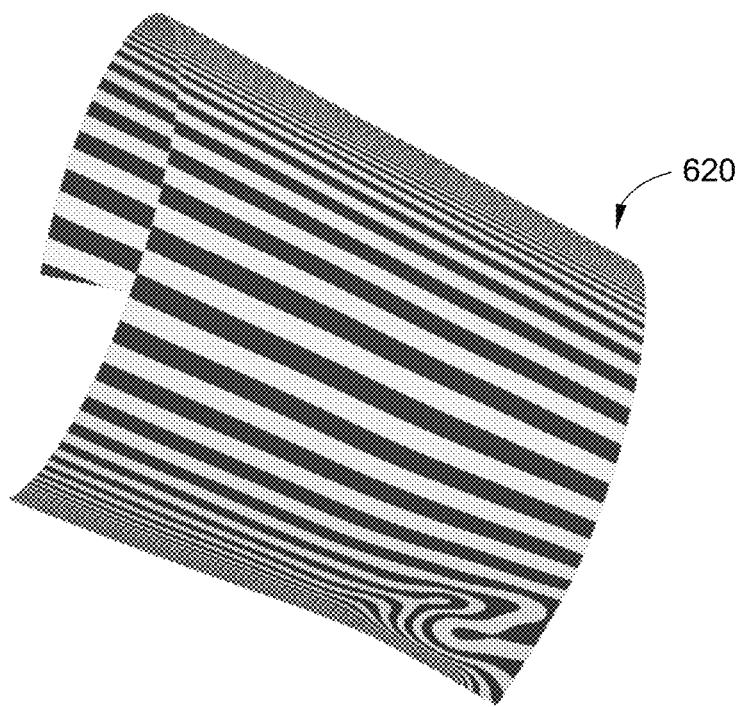

Smoothness of a surface can be represented by applying a reflection map. FIGS. 6A-6B show smoothness of surfaces for an undeformed MCAD surface 610 and for the deformed MCAD surface 620, respectively.

The extrapolation procedure can extend known grid data (i.e., deformation of a face) smoothly to a physically unbounded region, i.e., bounded only by the choice of parametric rectangular space. If the original MCAD face contains one or more holes, the extension of the known deformation into the one or more holes becomes an interpolation problem, which can be solved independently of the extrapolation problem. The interpolation problem can be solved more simply than the extrapolation problem because of two reasons: the hole regions decouple from the rest of the problem, so one large matrix factorization is not needed; and they can be solved via Laplace interpolation, which gives rise to a much sparser matrix equation than the least squares minimization in an extrapolation procedure.

Figure 7:
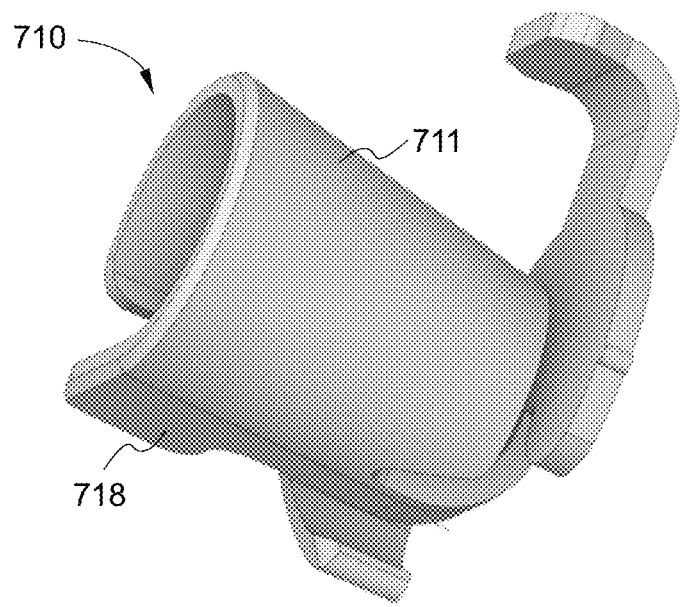
FIG. 7 is a diagram showing initial geometry and deformed geometry of an example physical object represented by respective MCAD models.
Figure 7:
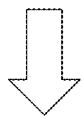
Figure 7:
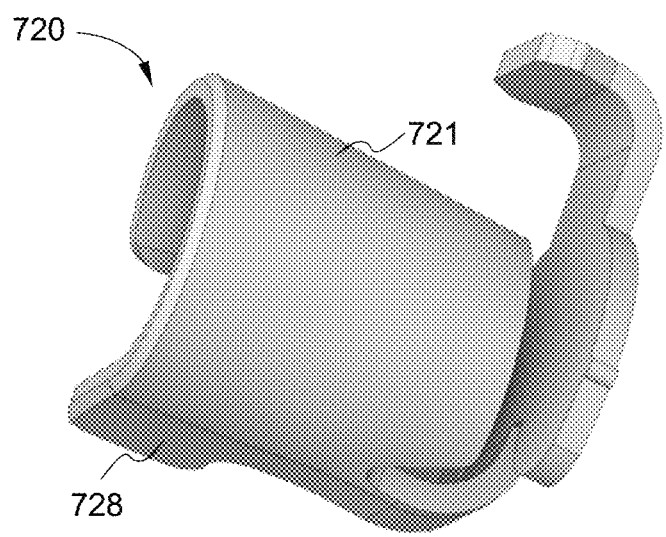

FIG. 7 shows an original MCAD model 710 representing initial undeformed geometry of a physical object (i.e., a connector) and a deformed MCAD model 720 representing deformed geometry of the physical object. There are a number of faces (e.g., faces 711, 718) in the original MCAD model 710. The corresponding faces 721, 728 are in the deformed MCAD model 720. The faces in the original MCAD model 710 and the faces in the deformed MCAD model 720 have one-to-one topological correlation.

Figure 8A:
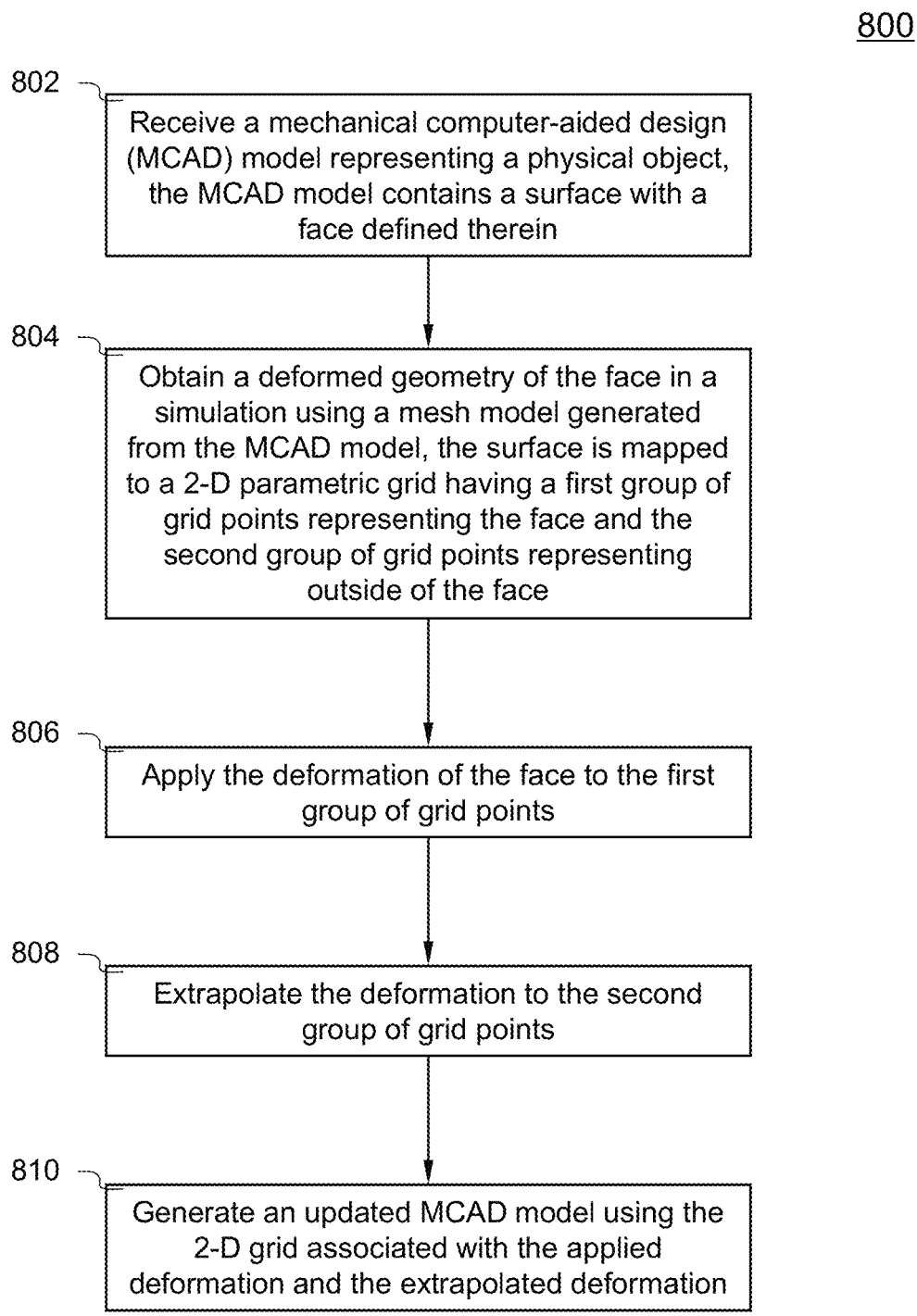
FIG. 8A is a flowchart showing an example process of generating an updated MCAD model that includes deformation of a face obtained in a simulation using a mesh model generated from a MCAD model.

FIG. 8A is a flowchart illustrating an example process 800 of generating an updated mechanical computer-aided design (MCAD) model representing a deformed object from an MCAD model representing an undeformed object. The deformed object includes deformation of a face obtained in a simulation using a mesh model generated from the MCAD model.

Figure 9A:
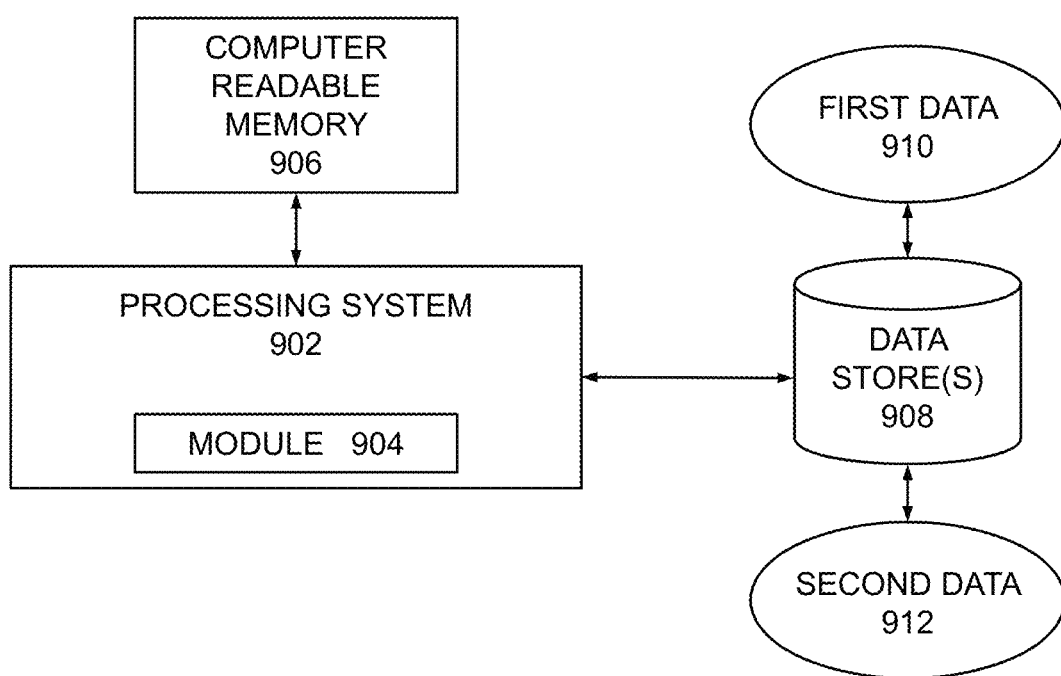
FIG. 9A is a block diagram showing an example system including a standalone computing architecture.
Figure 9B:
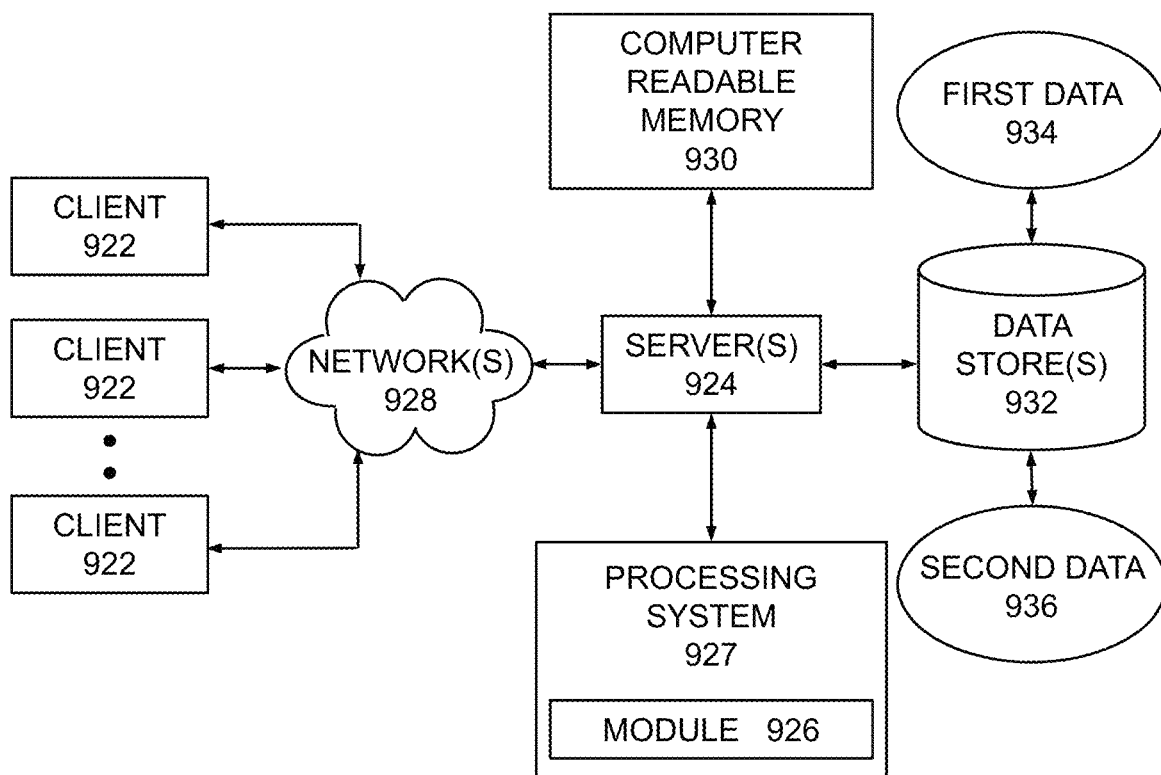
FIG. 9B is a block diagram showing an example system including a client-server computing architecture.

Process 800 starts at action 802 by receiving a MCAD model representing a physical object (e.g., part/product/structure) in a computer system (e.g., systems shown in FIGS. 9A-9B). The MCAD model contains an MCAD surface with a face defined therein. The surface is defined by NURBS patches, while the face is further bordered by one or more MCAD edges. For example, FIG. 1 shows a face 102 with an MCAD edge 104.

Next, at action 804, a deformation of the face is obtained in a simulation based on the MCAD model. The simulation comprises a computer-aided engineering (CAE) analysis, for example, finite element analysis (FEA). The simulation uses a mesh model (e.g., a FEA mesh model 110 shown in FIG. 1) generated from the MCAD model. The surface (e.g., a surface 300 in FIG. 3A) is mapped to a two-dimensional (2-D) grid in a parametric space (e.g., 2-D grid 310 in FIG. 3B). The 2-D grid contains a first group of grid points representing the face (e.g., region representing the face 410 in FIG. 4) and a second group of grid points representing outside of the face (e.g., region outside of the face 420).

At action 806, the deformation of the face is applied to the first group of grid points such that the grid point data represent the deformation of the face. Then, at action 808, the deformation of the face is extrapolated to the second group of grid points based on surface smoothness criteria.

Finally, at action 810, an updated MCAD model is generated using the 2-D grid associated with the applied deformation and the extrapolated deformation. The updated MCAD model is to represent a deformed physical object. The updated MCAD model contains at least one deformed surface which is singly curved or doubly curved based on surface smoothness criteria.

Figure 8B:
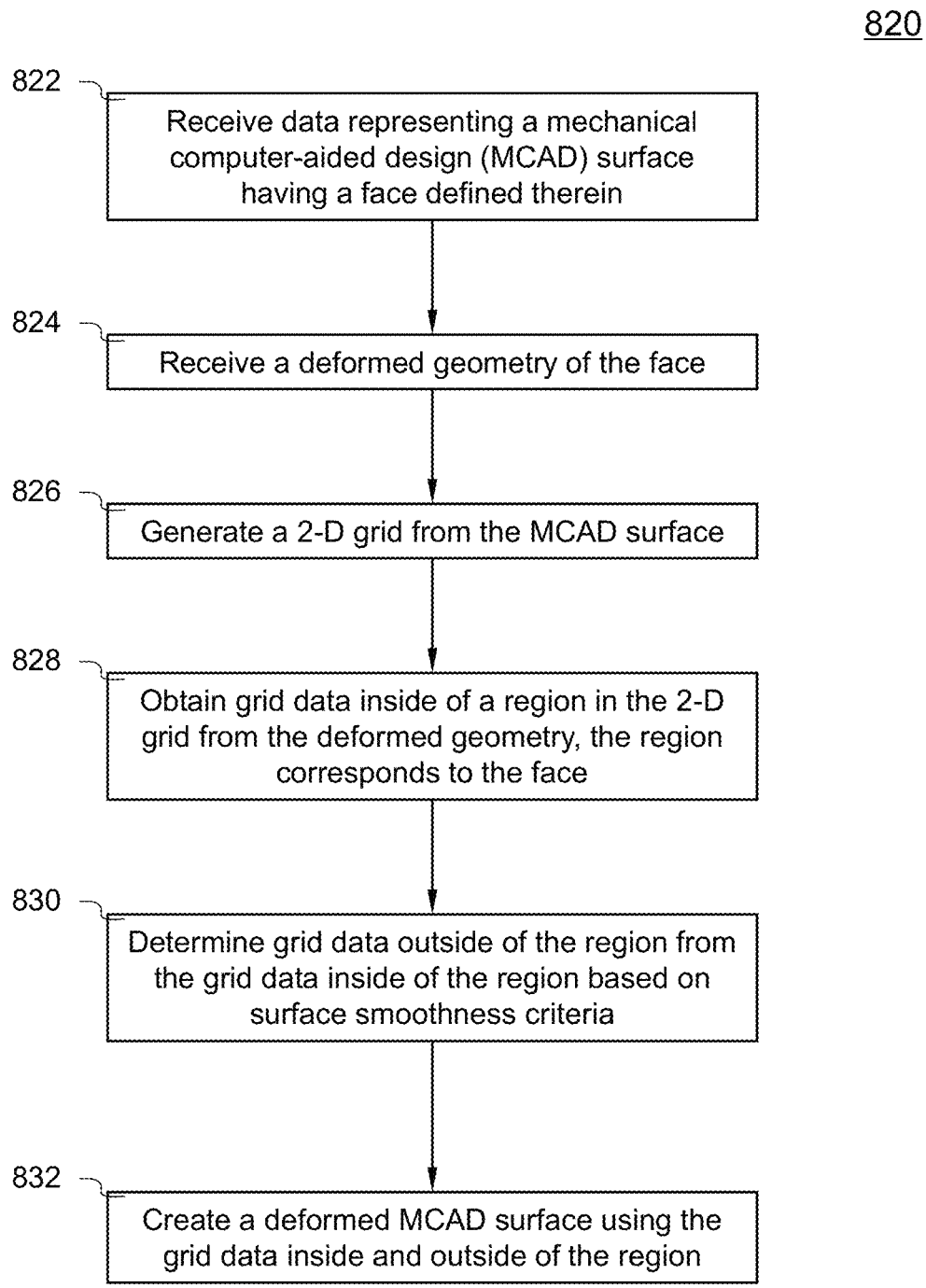
FIG. 8B is a flowchart showing an example process of creating a deformed MCAD surface that includes deformation of a face obtained in a simulation using an engineering analysis model generated from an undeformed MCAD surface.

FIG. 8B shows an example process 820 of creating a deformed mechanical computer-aided design (MCAD) surface that includes the deformation of a face obtained in a simulation using an engineering analysis model generated from an undeformed MCAD surface.

Process 820 starts at action 822 by receiving data representing an undeformed MCAD surface in a computer system (e.g., systems shown in FIGS. 9A-9B). The MCAD surface contains a face defined therein. The face is further bordered by one or more loops of MCAD edges. The undeformed MCAD surface belongs to a undeformed MCAD model representing a physical object (e.g., structure/product/part). Next, at action 824, the deformation of the face is also received. The deformation is obtained in a simulation (e.g., an engineering analysis simulation) using a computer-aided engineering (CAE) mesh model or engineering analysis model. The CAE mesh model can be generated from faces/edges in the undeformed MCAD model with known techniques. As a result of the simulation, a deformed mesh model is obtained. The deformation of the face can be determined by comparing the deformed mesh model with the undeformed mesh model.

Example engineering analysis simulation may include, but is not limited to, finite element analysis, boundary element analysis. Engineering analysis can be one of many different types, for example, linear, nonlinear, static, or dynamic. Engineering analysis model can include nodes connected by elements, etc.

The simulation is performed for a part/product under a design loading condition. In structural design, a design load is greater than the load which the system is expected to support. This is because engineers incorporate a safety factor in their design. Design loading condition is a condition for design a part/product to satisfy the design goal.

At action 826, a two-dimensional (2-D) grid is generated from the undeformed MCAD surface. There is a one-to-one correlation between the MCAD surface to the 2-D grid. Example grid points are distributed uniformly on the parametric space 310 of an undeformed MCAD surface 300 shown in FIG. 3A. Then, at action 828, grid data inside of a region corresponding to a face in the 2-D grid are obtained from the deformation of the face (e.g., via interpolation).

At 830, grid data outside of the region are determined from the known grid data inside of the region via an extrapolation procedure based on surface smoothness criteria. For example, the grid data outside of the region can be determined as follows: calculating the second and the third spatial derivatives at grid points outside of the region using the known grid data; and determining the grid data outside of the region via a linear least squares minimization of the second and the third spatial derivatives. Calculations of the second and the third spatial derivatives can be carried out based on finite difference techniques (e.g., using finite difference stencils).

When the outside of the region contains one or more holes, an interpolation procedure may be used for obtaining the grid data. One example interpolation procedure can be based on Laplace interpolation, which solves unknown grid data based on the known grid data in a 2-D grid.

Finally, at action 832, a deformed MCAD surface is created using all grid data (i.e., the grid data inside and outside of the region). This can be done by fitting non-uniform rational basis spline (NURBS) patches to form the deformed MCAD surface.

Resulting NURBS patches can be either singly curved smooth surface or a doubly curved smooth surface when the combined minimization of the second derivatives and the third spatial derivatives is used. Further, since the creation of a deformed MCAD surface is independent from that of another deformed MCAD surface, the operations can be carried out in a parallel-processing computing system with either shared or distributed memory subsystem.

The deformed MCAD surface belongs to a deformed MCAD model representing a deformed geometry of the physical object. The deformed MCAD model is then formed by combining faces/edges defined in one or more deformed MCAD surfaces. Such an operation is referred to as stitching.

The subject matter described herein may be implemented using any suitable processing system with any suitable combination of hardware, software and/or firmware, such as described below with reference to the non-limiting examples shown in FIGS. 9A-9C.

FIG. 9A depicts an example system 900 that includes a standalone computer architecture where a processing system 902 (e.g., one or more computer processors) includes a module 904 (e.g., software module stored in memory) being executed on it. The processing system 902 has access to a non-transitory computer-readable memory 906 in addition to one or more data stores 908. The one or more data stores 908 may contain first data 910 as well as second data 912.

FIG. 9B depicts another example system 920 that includes a client-server architecture. One or more clients 922 (e.g., user personal computer, workstation, etc.) accesses one or more servers 924 executing computer instructions of a module 926 (e.g., software module stored in memory) on a processing system 927 via one or more networks 928. The one or more servers 924 may access a non-transitory computer readable memory 930 as well as one or more data stores 932. The one or more data stores 932 may contain first data 934 as well as second data 936.

Figure 9C:
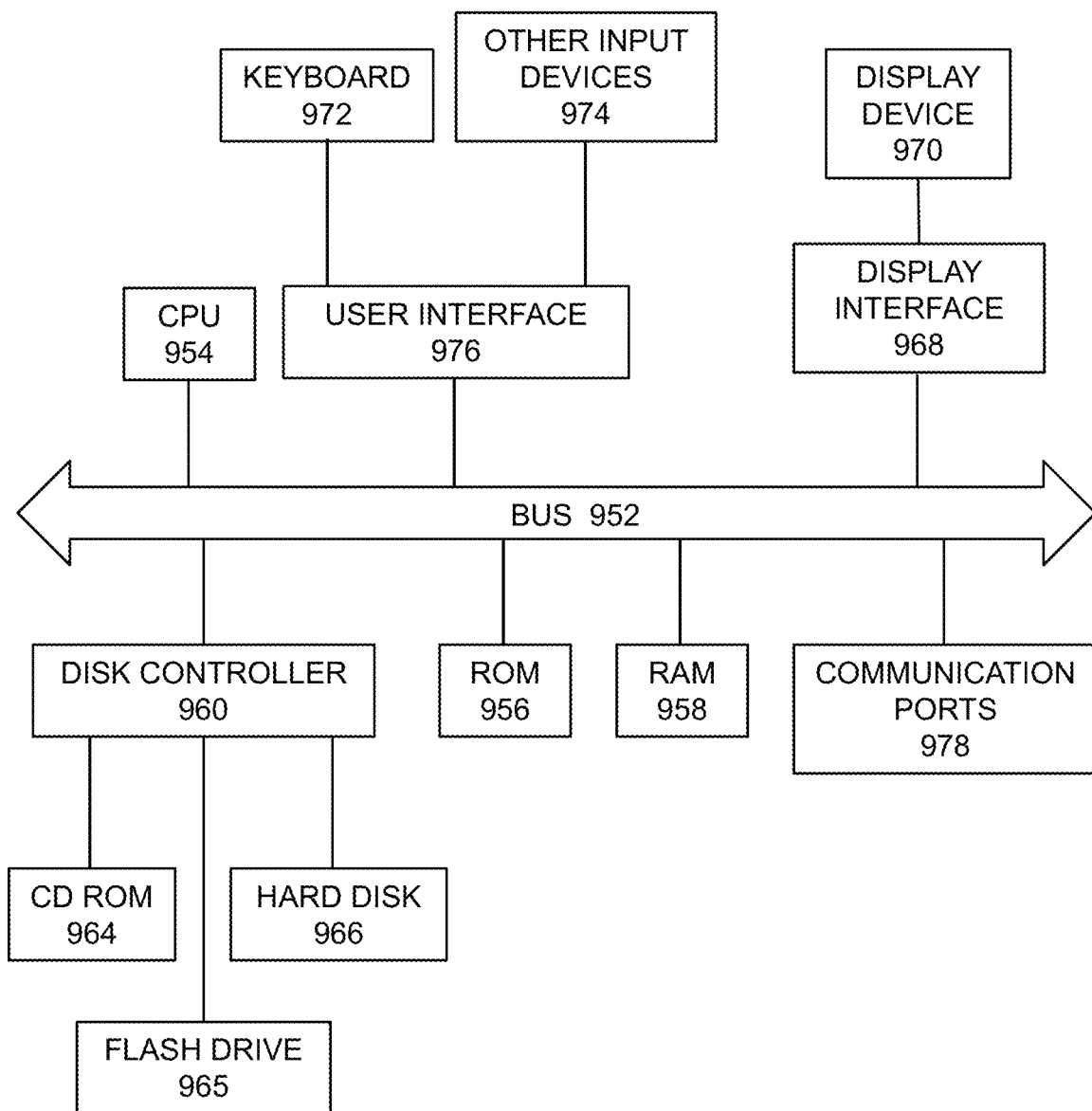
FIG. 9C is a function block diagram showing salient components of an example computing device for implementing the subject matters described herein.

FIG. 9C shows a function block diagram of example hardware for a standalone computer architecture 950, such as the architecture depicted in FIG. 9A, that may be used to contain and/or implement the subject matter described herein. A bus 952 may serve as the information highway interconnecting the other illustrated components of the hardware. A processing system 954 labeled CPU (central processing unit) (e.g., one or more computer processors), may perform calculations and logic operations required to execute a program/software/module. A non-transitory computer-readable storage medium, such as read only memory (ROM) 956 and random access memory (RAM) 958, may be in communication with the processing system 954 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 978.

A disk controller 960 interfaces one or more optional disk drives to the system bus 952. These disk drives may be external or internal flash memory drives 965, external or internal CD-ROM, CD-R, CD-RW or DVD drives 964, or external or internal hard disk drives 966. As indicated previously, these various disk drives and disk controllers are optional devices.

If needed, the processor 954 may access each of the following components: real-time data buffer, conveyors, file input processor, database index shared access memory loader, reference data buffer and data managers. Each component may include a software application stored in one or more of the disk drives connected to the disk controller 960, the ROM 956 and/or the RAM 958.

A display interface 968 may permit information from the bus 952 to be displayed on a display 970 in audio, video, graphical, text, or alphanumeric format.

In addition to the standard computer-type components, the hardware may also include data input devices, such as a keyboard 972, or other input device 974, such as a microphone, remote control, pointer, mouse, touch screen, and/or joystick.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, the terms "inside", "outside", "perpendicular", "front", "rear", "high", "low", "outer", and "inner" are intended to provide relative positions/locations for the purposes of description, and are not intended to designate an absolute frame of reference. Further, the order of blocks in process flowcharts or diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas example parametric space has been described and shown as a rectangle, other shape of parametric space may be used, for example, a periodical surface of a cylinder. Furthermore, whereas example minimization procedure has been described and shown as linear least squares minimization, other type of minimization procedures may be used for achieving the same. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method comprising:
receiving a mechanical computer-aided design (MCAD) model representing an object, the MCAD model comprising a surface with a face defined therein and an original model parameterization;
storing configurations for a set of surface smoothness criteria;
generating a mesh model based on the face of the MCAD model;
generating a deformed mesh model by using a simulation software that is configured to deform the mesh model based on one or more design loading conditions, wherein the deformed mesh model comprises a set of displacement data that describes deformation of a first region corresponding to the face of the surface, and wherein the set of displacement data does not describe deformation of a second region corresponding to the surface outside of the face;
mapping the surface of the MCAD model-to a two-dimensional (2-D) grid having a first group of grid points representing the face of the surface and corresponding to the first region for which deformation is known, and a second group of grid points representing the surface outside of the face and corresponding to the second region for which deformation is unknown; and
applying the set of displacement data to the MCAD model by generating an updated MCAD model representing a deformed object by:
creating a first set of patches corresponding to the first region for which deformation is known based on the set of displacement data and the first group of grid points;
creating a second set of patches corresponding to the second region for which deformation is unknown, using an extrapolation function based on the set of surface smoothness criteria, the set of displacement data, and the second group of grid points; and
combining the first set of patches and the second set of patches to create the updated MCAD model while maintaining the original model parameterization for the updated MCAD model.

2. The method of claim 1, wherein using the extrapolation function comprises calculating second spatial derivatives and third spatial derivatives at the second group of grid points using the set of displacement data.

3. The method of claim 2, wherein the second spatial derivatives and the third spatial derivatives are calculated based on a finite difference technique.

4. The method of claim 2, wherein using the extrapolation function comprises performing a linear least squares minimization of the second spatial derivatives and the third spatial derivatives.

5. The method of claim 4, wherein using the extrapolation function comprises performing a linear least squares constraint along a border between the first group of the grid points and the second group of grid points.

6. The method of claim 1, wherein the surface is defined by Non-Uniform Rational Basis Spline (NURBS) patches.

7. The method of claim 1, wherein a surface of the updated MCAD model surface comprises no self-intersections with continuous curvature.

8. The method of claim 1, further comprising:
determining whether the face contains one or more holes;
where the face does not contain one or more holes, creating the second set of patches using the extrapolation function; and
where the face does contain one or more holes, creating the second set of patches using an interpolation function.

9. The method of claim 8, wherein the interpolation function is based on Laplace interpolation.

10. The method of claim 1, wherein the one or more design loading conditions comprise a structural design load.

11. A system comprising:
a bus;
a memory storing instructions;
one or more processors coupled to the bus and the memory, the one or more processors executing the instructions from the memory to perform a method comprising:

receiving a mechanical computer-aided design (MCAD) model representing an object, the MCAD model having plurality of surfaces, each with a face defined therein;

storing configurations for a set of surface smoothness criteria;

generating a plurality of deformed mesh models by, for each surface of the plurality of surfaces:
  generating a mesh model based on the face of the MCAD model for that surface;
  generating a deformed mesh model by using a simulation software that is configured to deform the mesh model based on one or more design loading conditions, wherein the deformed mesh model comprises a set of displacement data that describes deformation of a first region corresponding to the face of the surface, and wherein the set of displacement data does not describe deformation of a second region corresponding to the surface outside of the face; and
  mapping that surface of the MCAD model to a two-dimensional (2-D) grid having a first group of grid points representing the face of that surface and corresponding to the first region for which deformation is known, and a second group of grid points representing that surface outside of the face and corresponding to the second region for which deformation is unknown;

generating an updated MCAD model representing a deformed object by, for each surface of the plurality of surfaces:
  creating a first set of patches corresponding to the first region for which deformation is known based on the set of displacement data and the first group of grid points;
  creating a second set of patches corresponding to the second region for which deformation is unknown, using an extrapolation function based on the set of surface smoothness criteria, the set of displacement data, and the second group of grid points; and
  combining the first set of patches and the second set of patches to create the updated MCAD model;

wherein generating the updated MCAD model further comprises a first processor and a second processor of the one or more processors operating in parallel on a first surface and a second surface of the plurality of surfaces.

* * * * *